(12) United States Patent
Rak et al.

(10) Patent No.: US 8,489,157 B2
(45) Date of Patent: Jul. 16, 2013

(54) HANDHELD ELECTRONIC DEVICE WITH EXTENDED DUAL-HINGED INTERCONNECTOR

(75) Inventors: Roman P. Rak, Waterloo (CA); Jason T Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 814 days.

(21) Appl. No.: 12/355,387

(22) Filed: Jan. 16, 2009

(65) Prior Publication Data

US 2009/0186670 A1   Jul. 23, 2009

Related U.S. Application Data

(63) Continuation-in-part of application No. 12/016,570, filed on Jan. 18, 2008.

(51) Int. Cl.
*H04M 1/00* (2006.01)

(52) U.S. Cl.
USPC ............ 455/575.3; 455/575.1; 455/566; 455/90.3; 455/41.2; 455/3.05; 379/428.01

(58) Field of Classification Search
USPC ........... 455/575.3, 550.1, 575.1, 566, 90.3, 455/90.2, 41.2, 3.05, 158.4, 154.2; 379/428.01; 345/3.1
See application file for complete search history.

(56) References Cited

U.S. PATENT DOCUMENTS

| | | | |
|---|---|---|---|
| D307,012 S | 4/1990 | Berkheij | |
| D310,237 S | 8/1990 | Ohsawa et al. | |
| 5,185,790 A | 2/1993 | Mischneko | |
| 5,537,472 A | 7/1996 | Estevez-Alcolado et al. | |
| D382,820 S | 8/1997 | Chan | |
| 6,118,986 A | 9/2000 | Harris et al. | |
| 6,434,404 B1 | 8/2002 | Claxton et al. | |
| D467,891 S | 12/2002 | Tokioka et al. | |
| 6,571,086 B1 * | 5/2003 | Uusimaki | 455/90.3 |
| 6,628,974 B1 * | 9/2003 | Lim | 455/575.3 |
| D484,918 S | 1/2004 | Okada et al. | |
| 6,775,560 B2 | 8/2004 | King et al. | |
| D496,636 S | 9/2004 | Lodato et al. | |
| D499,424 S | 12/2004 | Bahroocha | |
| 6,831,229 B1 | 12/2004 | Maeaettae et al. | |
| D507,554 S | 7/2005 | Kim | |
| 6,934,568 B2 | 8/2005 | Charlier et al. | |

(Continued)

FOREIGN PATENT DOCUMENTS

| | | |
|---|---|---|
| EP | 1463273 A | 9/2004 |
| EP | 1583330 A | 10/2005 |

(Continued)

OTHER PUBLICATIONS

EESR, EP09150797.0; Apr. 21, 2009.

(Continued)

Primary Examiner — Shaima Q Aminzay
(74) Attorney, Agent, or Firm — Fitch, Even, Tabin & Flannery LLP

(57) ABSTRACT

A clam-shell style handheld electronic device having a dual-hinged interconnector between a display housing and a keyboard housing. The dual-hinged interconnector can be configured to act as a handle when the device is being held during text entry and to act as a stand when the open device is placed on a substantially flat surface.

10 Claims, 11 Drawing Sheets

U.S. PATENT DOCUMENTS

| | | | |
|---|---|---|---|
| 7,016,703 | B2 | 3/2006 | Kishimoto et al. |
| D525,230 | S | 7/2006 | Kim et al. |
| D539,772 | S | 4/2007 | Park et al. |
| D548,210 | S | 8/2007 | Lewis |
| D549,680 | S | 8/2007 | Lee et al. |
| 7,263,391 | B2 | 8/2007 | Sugiyama et al. |
| D551,200 | S | 9/2007 | Escorcia et al. |
| D561,719 | S | 2/2008 | Cho |
| D561,723 | S | 2/2008 | Kim et al. |
| D562,289 | S | 2/2008 | Suk et al. |
| D566,080 | S | 4/2008 | Kim et al. |
| D566,671 | S | 4/2008 | Lee |
| D570,319 | S | 6/2008 | Lee et al. |
| D571,344 | S | 6/2008 | Kim et al. |
| D584,268 | S | 1/2009 | Kim |
| 7,480,379 | B2* | 1/2009 | Yoshikawa ............... 379/433.06 |
| 2003/0078077 | A1 | 4/2003 | Kokubo |
| 2003/0224739 | A1 | 12/2003 | Ikuta |
| 2003/0228884 | A1* | 12/2003 | Iwai et al. .................. 455/550.1 |
| 2004/0097258 | A1* | 5/2004 | Lee et al. ................... 455/550.1 |
| 2004/0189597 | A1 | 9/2004 | Amitani et al. |
| 2004/0212956 | A1* | 10/2004 | Kuivas et al. .................. 361/683 |
| 2005/0101358 | A1* | 5/2005 | Carpenter .................. 455/575.1 |
| 2006/0034601 | A1* | 2/2006 | Andersson et al. ........... 396/157 |
| 2007/0015551 | A1 | 1/2007 | Iwama et al. |
| 2007/0054710 | A1 | 3/2007 | Pan |
| 2008/0293459 | A1 | 11/2008 | Wang |

FOREIGN PATENT DOCUMENTS

| | | | |
|---|---|---|---|
| EP | 1614913 | A | 1/2006 |
| EP | 1653713 | A | 5/2006 |
| EP | 1670218 | A | 6/2006 |
| JP | 11/196167 | A | 7/1999 |
| WO | 2004/013439 | A | 2/2004 |
| WO | 2004/021685 | A | 3/2004 |
| WO | 2006120300 | A | 11/2006 |

OTHER PUBLICATIONS

XP002401919 T-Mobile MDA—Last reviewed on Feb. 17, 2006, retrieved Oct. 4, 2006.

NEC e808 telephone, announced 1st quarter 2003, [online], [site visited Jan. 19, 2009]. Available from internet, <URL: http://www.gsmarena.com>.

Samsung Serene telephone, announced Oct. 2005, [online], [site visited Jan. 19, 2009]. Available from Internet, <URL: http://www.gsmarena.com>.

NEC 910 telephone, announced 1st quarter 2004, [online], [site visited Jan. 19, 2009]. Available from Internet, <URL: http://www.gsmarena.com>.

i-mate JAQ telephone, announced Sep. 2006, [online], [site visited Jan. 19, 2009], Available from Internet, <URL: http://www.gsmarena.com>.

Samsung D810 telephone, announced 1st quarter 2006, [online], [site visited Jan. 19, 2009]. Available from Internet, <URL: http://www.gsmarena.com>.

Examination Report dated Feb. 26, 2010. In corresponding application No. 09150797.0.

Examination Report dated Oct. 19, 2010. In corresponding application No. 09150797.0.

* cited by examiner

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L |   |
| Z | X | C | V | B | N | M |   |   |   |

*FIG. 4A*

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L |   |
| Y | X | C | V | B | N | M |   |   |   |

*FIG. 4B*

| 1 | 2 | 3 | 4 | 5 | 6 | 7 | 8 | 9 | 0 |
|---|---|---|---|---|---|---|---|---|---|
| A | Z | E | R | T | Z | U | I | O | P |
| Q | S | D | F | G | H | J | K | L |   |
| W | X | C | V | B | N | M |   |   |   |

*FIG. 4C*

| 1 | 2 | 3 | 4 | 5 | 6 | 7 | 8 | 9 | 0 |
|---|---|---|---|---|---|---|---|---|---|
|   |   |   | P | Y | F | G | C | R | L |
| A | O | E | U | I | D | H | T | N | S |
|   | Q | J | K | X | B | M | W | V | Z |

*FIG. 4D*

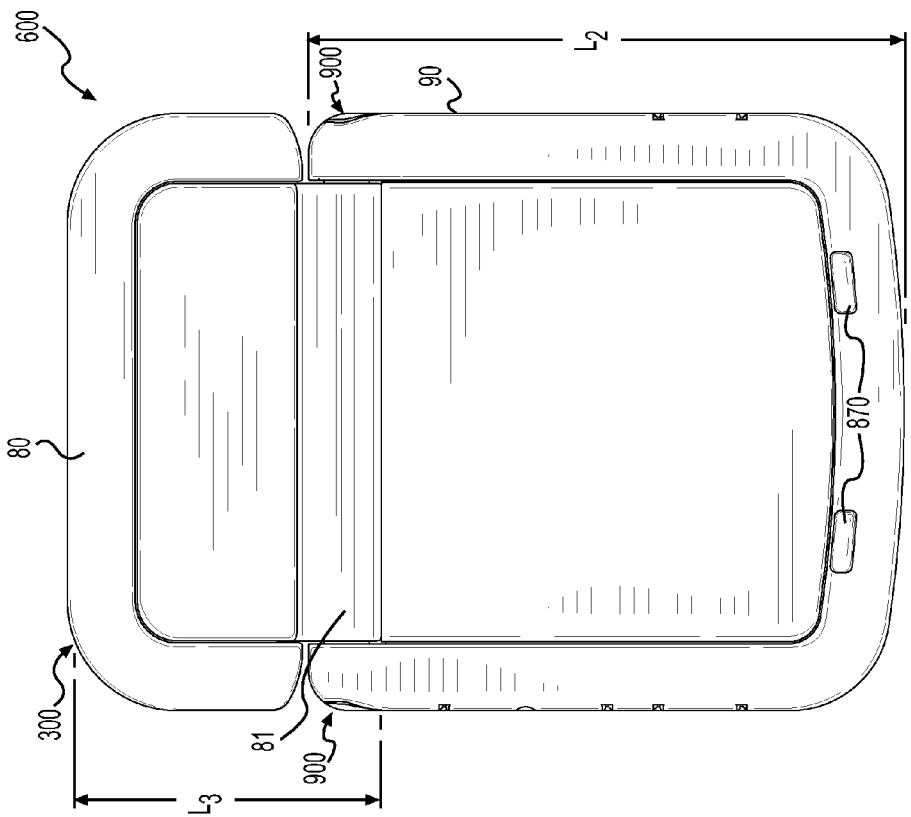
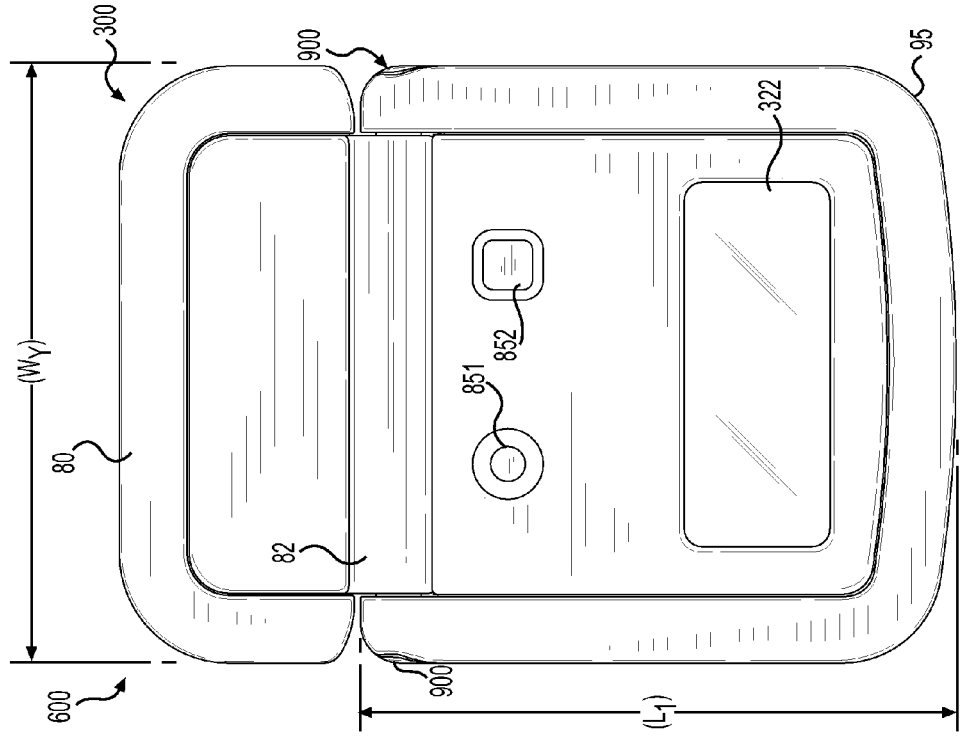

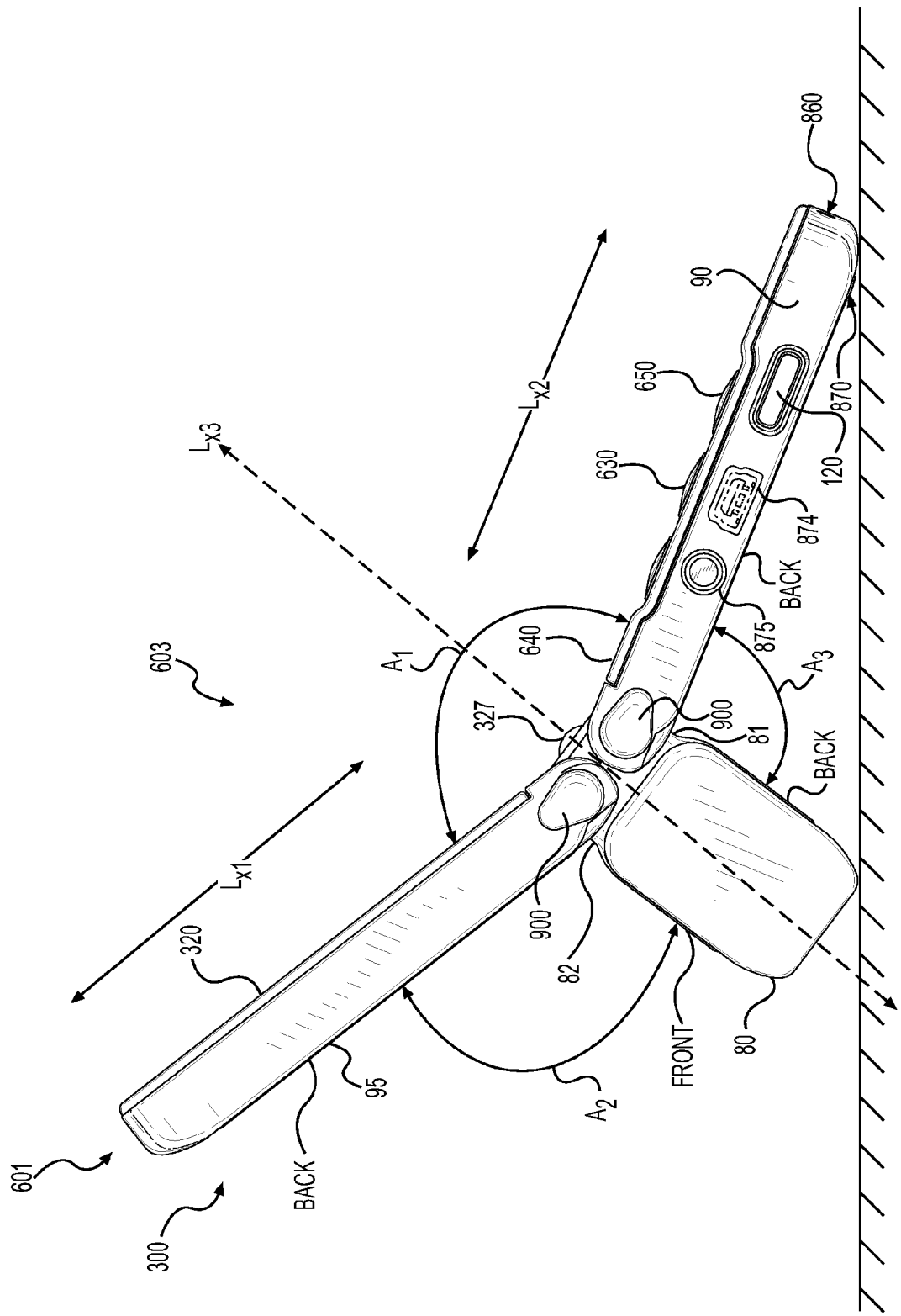

HANDHELD ELECTRONIC DEVICE WITH EXTENDED DUAL-HINGED INTERCONNECTOR

PRIORITY CLAIM

The present application is a continuation-in-part of application Ser. No. 12/016,570, filed on Jan. 18, 2008. Said application is incorporated herein by reference in its entirety.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD

This disclosure, in a broad sense, is directed towards a clam-shell style handheld electronic device with wireless communication capabilities and towards the networks within which the device operates. The present disclosure further relates to a clam-shell style handheld electronic device with an extended dual-hinged interconnector for pivotally connecting a keyboard housing to a display housing.

BACKGROUND

With the proliferation of wireless communication systems, compatible handheld electronic devices are becoming more prevalent, as well as advanced. Whereas in the past such handheld electronic devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile electronic devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile electronic devices. The size of keyboards has been reduced over the years, as newer, smaller devices have become popular. Cell phones, for example, are now sized to fit in one's pocket or the palm of the hand. As the size of the devices has decreased, it has become more important to utilize the entire keyboard surface as efficiently as possible. Thus, a need exists for a handheld electronic device which can be operated easily from a device perspective and a data entry perspective.

BRIEF DESCRIPTION OF THE DRAWINGS

Exemplary methods and arrangements conducted and configured according to the advantageous solutions presented herein are depicted in the accompanying drawings wherein:

FIG. 4A illustrates an exemplary QWERTY keyboard layout;

FIG. 4B illustrates an exemplary QWERTZ keyboard layout;

FIG. 4C illustrates an exemplary AZERTY keyboard layout;

FIG. 4D illustrates an exemplary Dvorak keyboard layout;

FIG. 8 illustrates a front view of a clam-shell style handheld electronic device in a closed configuration;

FIG. 9 illustrates a rear view of the clam-shell style handheld electronic device of FIG. 8;

FIG. 15 illustrates a right side view of the clam-shell style handheld electronic device of FIG. 14 in a resting orientation.

DETAILED DESCRIPTION

Figure 1:
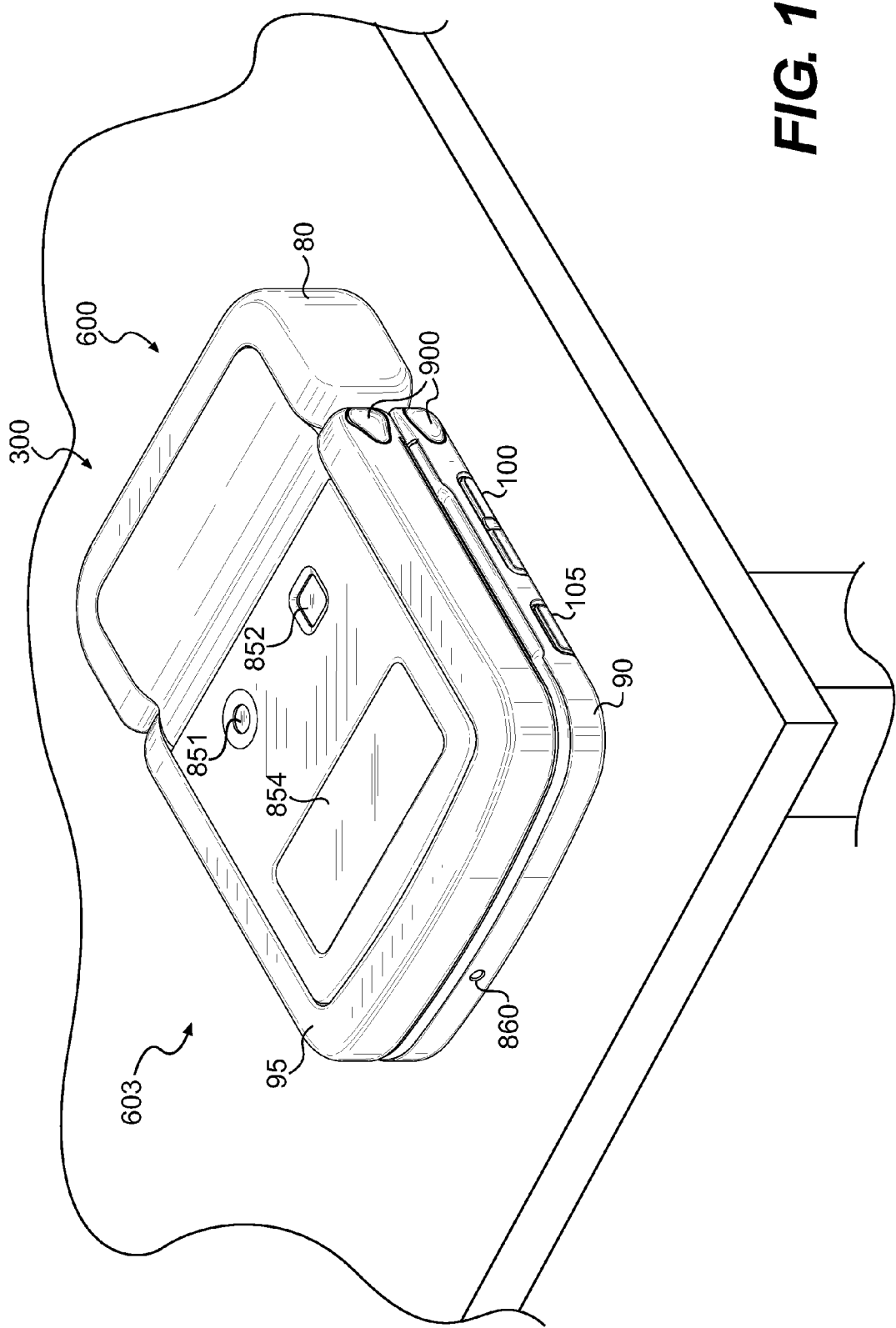
FIG. 1 illustrates a clam-shell style handheld electronic device in a closed configuration in a resting orientation.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the disclosed subject matter. Still further, in the drawings, the same reference numerals are employed for designating the same elements.

As the size of the devices has decreased it has also become more important to maintain the ease with which the user can utilize the keyboard. Advances in technology have allowed for such reductions of scale that ergonomic handleability can be of benefit. Additionally, as the size of devices has decreased it has allowed for use in more and more environments. A user can use a device as a telephone, a text entry point and as a web browser, quickly alternating between various modes. Because of these multiple roles for such devices and their prevalence of use, a user can wish to set a device down and not have a display screen face or point straight up, but instead will wish to for the display screen to substantially face the user.

Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

Figure 2A:
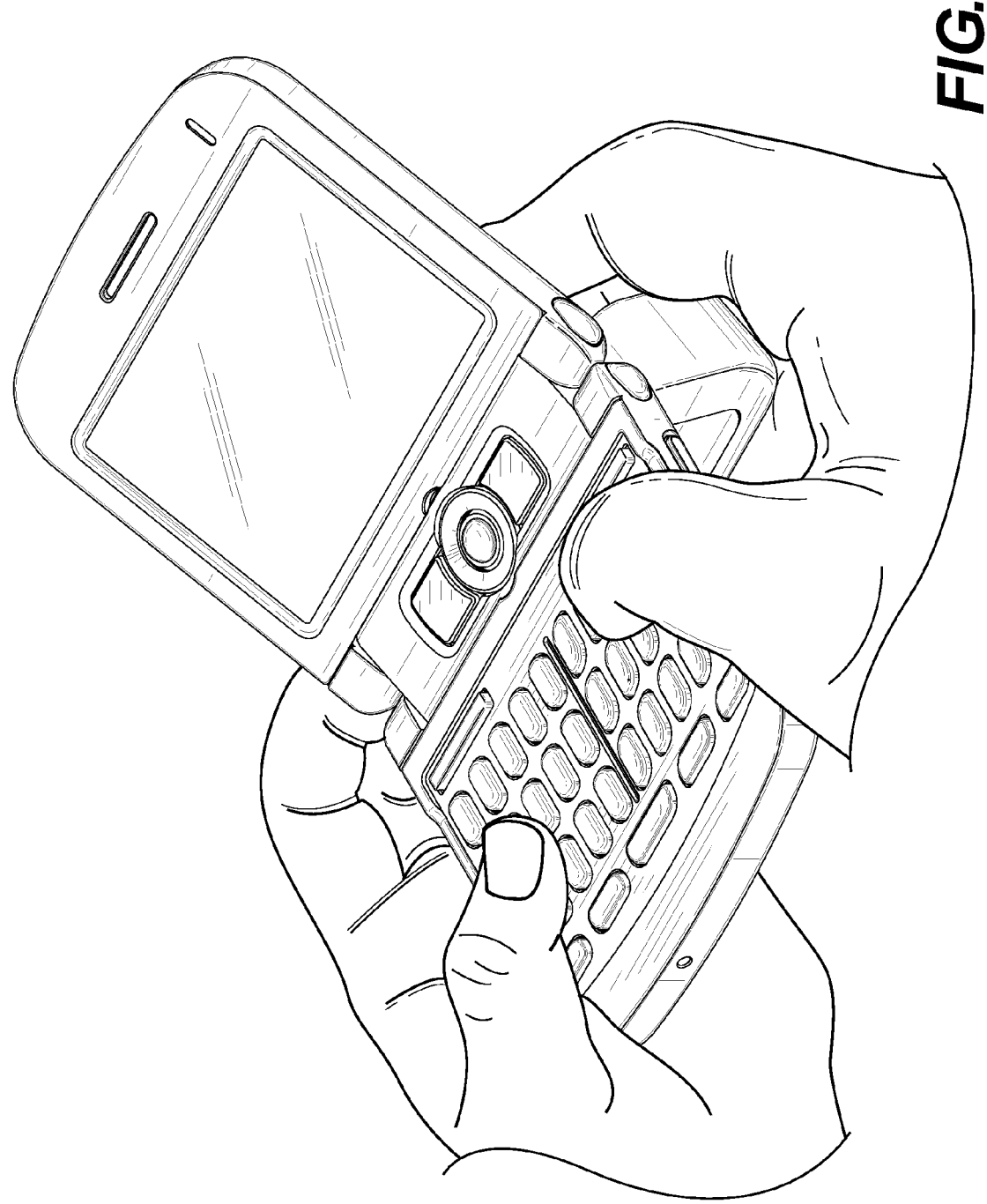
FIG. 2A-2B illustrates a clam-shell style handheld electronic device in an open configuration.
Figure 2B:
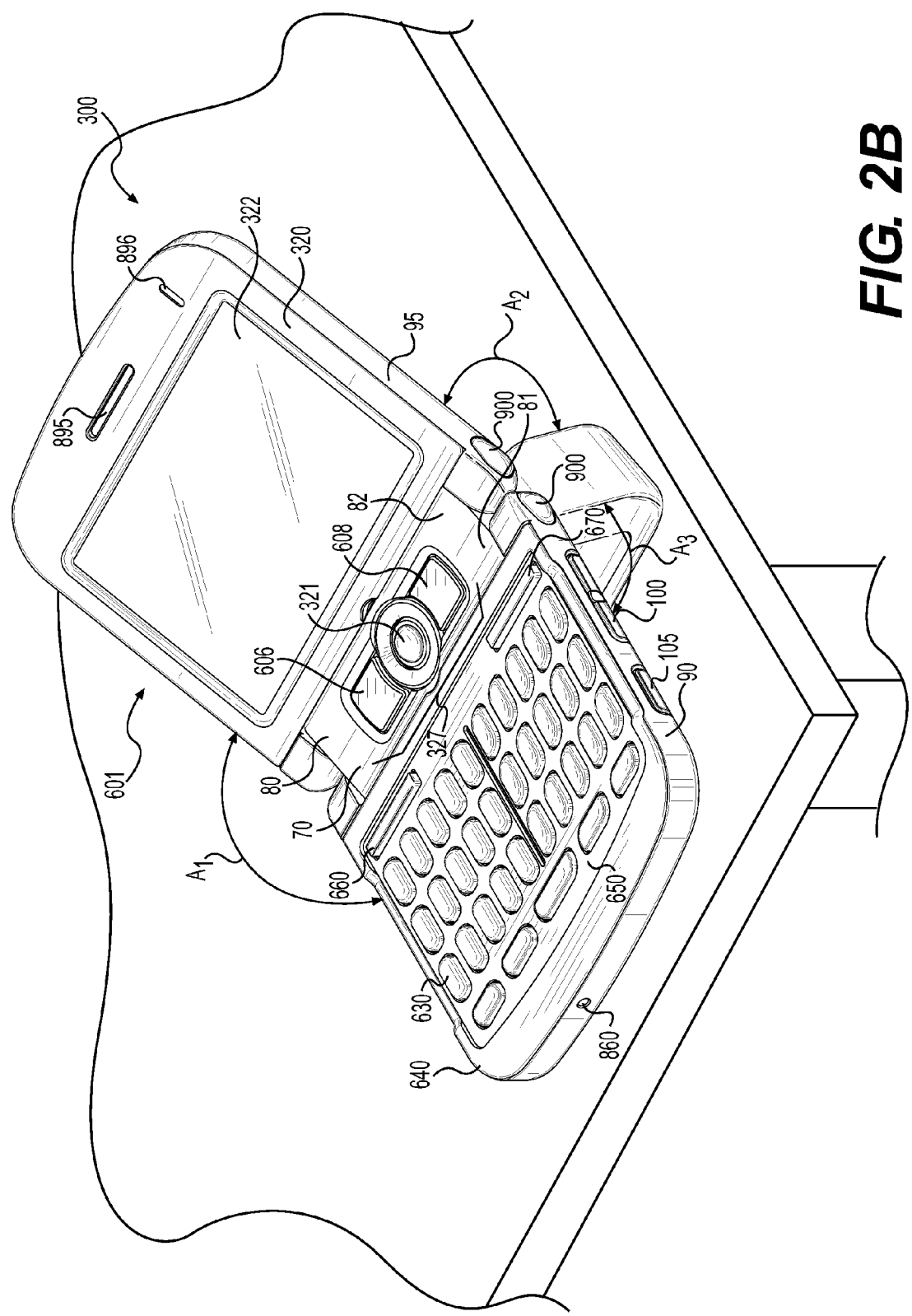

An example of a clam-shell style handheld electronic device 300 resting 603 on a flat surface in a closed configuration is shown in FIG. 1. An example of the device 300 in an open configuration 601 within a user's hands is shown in FIG. 2A. An example of the device 300 in an open configuration 601 resting on a surface is shown in FIG. 2B. It is to be understood that all figures in the present disclosure are exemplary only, and those persons skilled in the art will appreciate the additional elements and modifications necessary to make the device 300 work in particular network environments.

Figure 3:
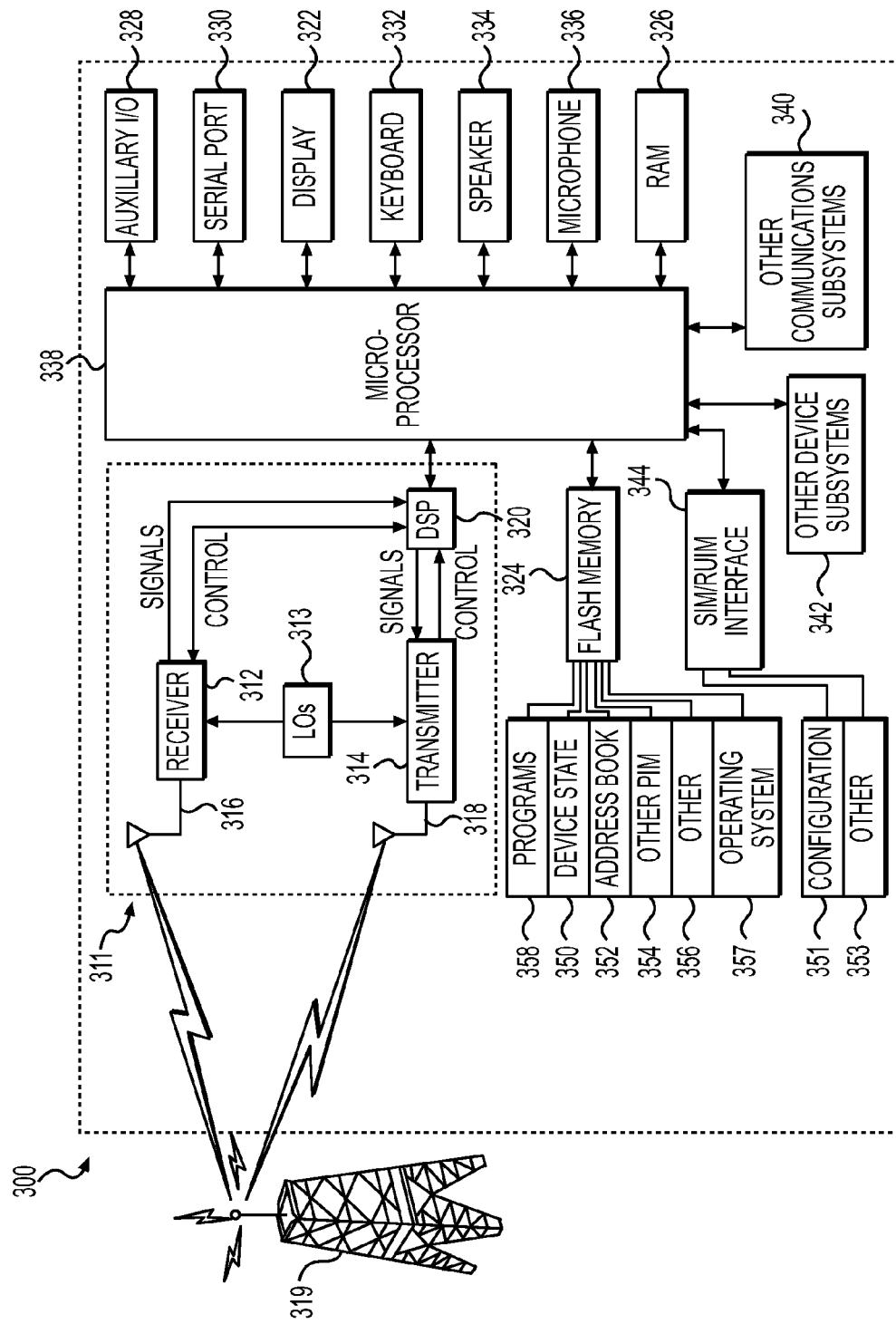
FIG. 3 is a block diagram representing a clam-shell style handheld electronic device interacting in a communication network.

The handheld electronic device 300 can be configured to cooperate with a wireless network as illustrated in FIG. 3. It is contemplated that communication by the handheld electronic device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319 as depicted in FIG. 3.

The handheld electronic device 300 in the block diagram of FIG. 3 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 650, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and can enable execution of software applications on the handheld electronic device 300.

In the exemplary configuration of FIG. 3, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358, manages the sharing of memory 324 among multiple applications 358, handles input and output to and from other device subsystems 342. In addition, users can typically interact directly with the operating system 357 through a user interface, which can include the keyboard 650 and display screen 322. While in an exemplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof can be loaded in RAM 326 or other volatile memory.

With further reference to FIG. 3, the flash memory 324 can contain programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the electronic device 300 is enabled for two-way communication within the wireless communication network 319 as depicted in FIG. 3, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the electronic device 300 can require a unique identifier to enable the electronic device 300 to transmit and receive signals from the communication network 319. Other systems can not require such identifying information. GPRS, UMTS, and EDGE use a Subscriber Identity Module (SIM) in order to allow communication with the communication network 319. Likewise, most CDMA systems use a Removable Identity Module (RUIM) in order to communicate with the CDMA network. The RUIM and SIM card can be used in multiple different electronic devices 300. The electronic device 300 can be able to operate some features without a SIM/RUIM card, but it will not be able to communicate with the network 319. A SIM/RUIM interface 344 located within the electronic device 300 allows for removal or insertion of a SIM/RUIM card (not shown). The SIM/RUIM card features memory and holds key configurations 351, and other information 353 such as identification and subscriber related information. With a properly enabled electronic device 300, two-way communication between the electronic device 300 and communication network 319 is possible.

When equipped for two-way communication, the handheld electronic device 300 also features a communication subsystem 311 as indicated in FIG. 3. The communication subsystem 311 can modified so that it can support the operational needs of the handheld device 300. As shown in FIG. 3, the subsystem 311 includes a transmitter 314 and receiver 312 including the associated antenna or antennae 316, 318 as described above, local oscillators (LOs) 313, and a processing module 320 which in the presently described exemplary embodiment is a digital signal processor (DSP) 320.

If the handheld electronic device 300 is enabled as described above, or the communication network 319 as shown in FIG. 3 does not require such enablement, the two-way communication enabled handheld device 300 is able to both transmit and receive information from the communication network 319. The transfer of communication can be to and from the handheld device 300. In order to communicate with the communication network 319, the handheld device 300 in the presently described exemplary embodiment is equipped with an integral or internal antenna 318 for transmitting signals to the communication network 319. Likewise the handheld electronic device 300 in the presently described exemplary embodiment can be equipped with another antenna 316 for receiving communication from the communication network 319. These antennae 316, 318 in another exemplary embodiment can be combined into a single antenna (not shown). As one skilled in the art would appreciate, the antenna or antennae 316, 318 in another embodiment could be externally mounted on the handheld device 300.

Additionally, some applications, such as shown in FIG. 3, which can depend on data transfer data include email, address book entries and calendars. For each such application, synchronization with home-based versions on the applications can be critical for either or both of their long term and short term utility. As an example, emails are often time sensitive, so substantially real time synchronization is highly desirable. Address book entries, on the other hand, can be usually updated less frequently without inconvenience. Therefore, the utility of the handheld device 300 can be enhanced when connectable within a communication system, and particularly when connectable on a wireless basis in a network 319 in which voice, text messaging, and other data transfer are accommodated. The auxiliary I/O subsystem 328 of FIG. 3 can take the form of a variety of different navigation tools (multi-directional or single-directional) such as a navigation tool 327 with trackball assembly 321 as illustrated in the exemplary embodiment shown in FIG. 2, or a thumbwheel, a navigation pad, a joystick, or the like (not shown). As will be developed more fully below, these navigation tools are located on the front surface of the handheld device 300 when in an open configuration 601 but can also be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld device 300 are considered within the scope of this disclosure.

The handheld electronic device 300 as described above can be the clam-shell device 300 as illustrated in FIGS. 1-2, and 8-15. FIG. 1 shows the clam-shell style handheld device 300 is in a closed configuration 600 in a resting orientation 603 and several features of the depicted embodiment are present. For example, a microphone hole 860 is visible on the keyboard housing 90. Visible on the back of the display housing 95 are a display screen 854, a camera 851 and flash 852. Also visible is one of the programmable buttons 105 on the keyboard housing 90 and volume control buttons 100 alongside. One can also see two of the hinge-end covers 90 which cover the ends of one or more spring assemblies 750 that run through the interconnector 80 and into the display housing 95 and keyboard housing 90.

FIG. 2A shows an embodiment of the clam-shell style handheld electronic device 300 in an open configuration 601 being held in the hands of a user, ready for thumb activation of the keyboard 650. FIG. 2B shows an embodiment of the handheld electronic device 300 in a resting configuration 603 on a flat surface. In FIG. 2B the receiver 895 is above the display screen 322 on the display housing 95. Beside the receiver 895 is a light emitting diode 896, and beneath is a display screen 322 on the interior side of the display screen housing 320. Beneath the display screen 322 is a navigational tool 327, which in the illustrated embodiment comprises a trackball assembly 321. The trackball assembly 321 is located on the interior of the dual-hinged interconnector 80. Note in FIG. 2B that the trackball assembly 321 can be predominantly housed within the dual-hinged interconnector 80 and that a portion of the trackball assembly 321 is exposed at the interior surface 70 of said dual-hinged interconnector 80 in the open configuration 601 of the device 300. Beneath this "navigation row" 70 is a keyboard 650. The keyboard 650 rests on the interior side of the keyboard housing 640. Those skilled in the art will appreciate that the keyboard 650 could comprise various alphanumeric keys 630 having any of the layouts shown by FIGS. 4-7, or others. FIG. 2B shows volume control keys 100, for controlling speaker volume, and a user programmable button 105 are visible on the outer left side of the keyboard housing 90. Additionally, other keys can be placed along the side of the handheld device 300 to function as escape keys, volume control keys 100, scrolling keys, power switches, or user programmable keys 105, 120, and can likewise be programmed accordingly. In the open configuration 601 shown, the angle $A_1$ between the display housing 95 and the keyboard housing 90 is adjustable at the interior side of the dual-hinged interconnector 80.

Figure 5:
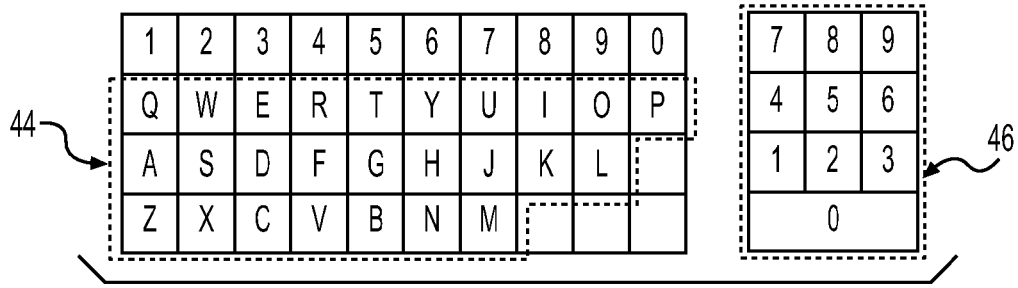
FIG. 5 illustrates a QWERTY keyboard layout paired with a traditional ten-key keyboard.
Figure 6:
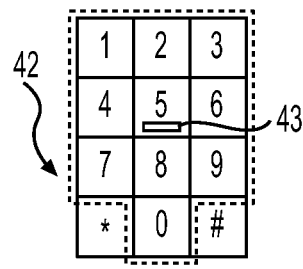
FIG. 6 illustrates ten digits comprising the numerals 0-9 arranged in a traditional, ITU Standard E.161 numeric telephone keypad layout, including the * and # keys flanking the 0 key.
Figure 7:
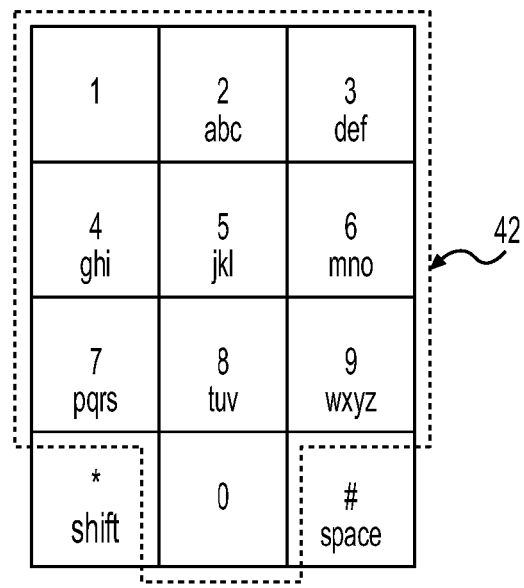
FIG. 7 illustrates a traditional or standard phone key arrangement or layout according to the ITU Standard E.161 including both numerals and letters.

While the alphanumeric input keys in FIGS. 2A and 2B indicia, they could be arranged according to standard layouts as in FIG. 4 which shows the four possible keyboard 650 configurations, the QWERTY 44a, the QWERTZ 44b, the AZERTY 44c and the DVORAK 44d, or as in FIG. 5 which illustrates a QWERTY keyboard layout paired with a traditional ten-key keypad. The keys 630 could also have layouts like those shown in FIGS. 6 and 7, the last of which is ITU compliant. The International Telecommunications Union ("ITU") has established phone standards for the arrangement of alphanumeric keys, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. FIG. 6 illustrates a keypad comprising the numerals 0-9 arranged in a traditional, ITU Standard E.161 numeric telephone keypad layout, including the * and # keys flanking the 0 key. FIG. 7 illustrates a traditional or standard phone key arrangement or layout according to the ITU Standard E.161. Again, the keyboard 650, as shown in FIG. 2A and FIG. 2B for example, can be further provided with each of such layouts.

One of the important aspects of the handheld electronic device 300 to which this disclosure is directed is its size. While some users will grasp the handheld device 300 in both hands when entering text as in FIG. 2A, it is also possible for users to cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand.

However, some users can find it difficult to operate because of the reduced size. The dual-hinged interconnector 80 gives an increase in surface area and a protruding surface to grasp as well. The extended nature of the dual-hinged interconnector 80 allows the clam-shell style handheld electronic device 300 to be held between the fingers of both hands. Thus, the interconnector can act as a handle of sorts. Moreover, this configuration enhances stability and hence makes thumb activation of the keys on keyboard housing 640.

Additionally, the small size of the handheld device 300 can be a drawback in that there is limited exterior surface area for the inclusion of user input and device output features. This is especially true for the "prime real estate" on the face of the keyboard housing 640 of the handheld device 300 in the open configuration 601. Furthermore, as shown in the embodiment of FIG. 2A, the display screen 322 is located above a keyboard 650 that is utilized for data entry into the handheld device 300 by the user, and above a navigation tool 327 which is located on the interior surface of the dual-hinged interconnector. If the screen 322 is provided below the keyboard 650, a problem occurs in that viewing the screen 322 is inhibited when the user is inputting data using the keyboard 650. Therefore, in the embodiment shown in FIG. 2B, the display screen 322 is above the navigation row 70 and keyboard 650, thereby solving the problem by assuring that the hands and fingers do not block the view of the screen 322 during data entry periods. This property is enhanced by the fact that the angle between the interior surface of the keyboard housing 640 and the interconnector 80, and the angle between the interconnector 80 and the display face 320 can each take separate values, and thus more positional options exist for the user.

Another positional option for the user is to set the device down 300 temporarily, as in FIG. 2B (and also FIG. 15). If the user places the device on a flat surface a user can derive a benefit from being able to view the display screen 322 without having to lift the device 300 by hand. As can be seen from FIG. 2B, the dual-hinged interconnector 80 can act as a stand which props up the display housing 95. Because they are connected via hinges, the angle $A_1$ between the display housing 95 and the keyboard housing 90, the angle $A_2$ between the back of the interconnector 81 and the display housing, and the angle $A_3$ between the interconnector 80 and the keyboard housing 90 are all adjustable. This adjustability, coupled with the stand action of the interconnector, 80 means that a user will be able to adjust the display screen 322 for maintenance of visual contact while the device 300 is in a resting orientation 303.

FIG. 8 shows the front of an embodiment of the clam-shell style handheld electronic device 300 in a closed configuration. In a closed configuration 600 a display screen 322 and a keyboard 650 can be wholly or partially covered. The device 300 can be equipped with an external mirror (not shown), a camera 851, a flash 852 for use in conjunction therewith, as well as a light emitting diode 853. Those skilled in the art will appreciate that these items could have different positions and still come within this disclosure. In the embodiment shown FIG. 8 the dual-hinged interconnector 80 has a length $L_3$ which is greater than at least twenty percent of the length of the display housing $L_1$. This allows for the interconnector 80 to act as both a stand and a handle as set forth previously.

FIG. 9 shows the rear or back of an embodiment of the device 300 in a closed configuration 600. A first side 81 of the dual-hinged interconnector 80 is shown in a mutually accommodating relationship with the keyboard housing 90. Two charge contacts 807 are shown towards the lower portion of keyboard housing 90. The keyboard housing 90 can be seen to have a substantially square profile 800. As will be appreciated by those in the art, while a particular rectangular shape is shown for the handheld electronic device 300, others are possible while still falling within the present disclosure. In the embodiment shown, the dual-hinged interconnector 80 has a length L3 greater than at least twenty percent of a length L1 of the longer of the display housing 95 and the keyboard housings 90, and the lengthwise longitudinal axes of each of the display housing 95 and the keyboard housings 90 and dual-hinged interconnector 80 are shown oriented substantially parallel, one to the others. However, those skilled in the art will appreciate that the dual-hinged interconnector 80 or the display housing 95 or keyboard housing 90 could be constructed in various proportions within this disclosure.

Figure 10:
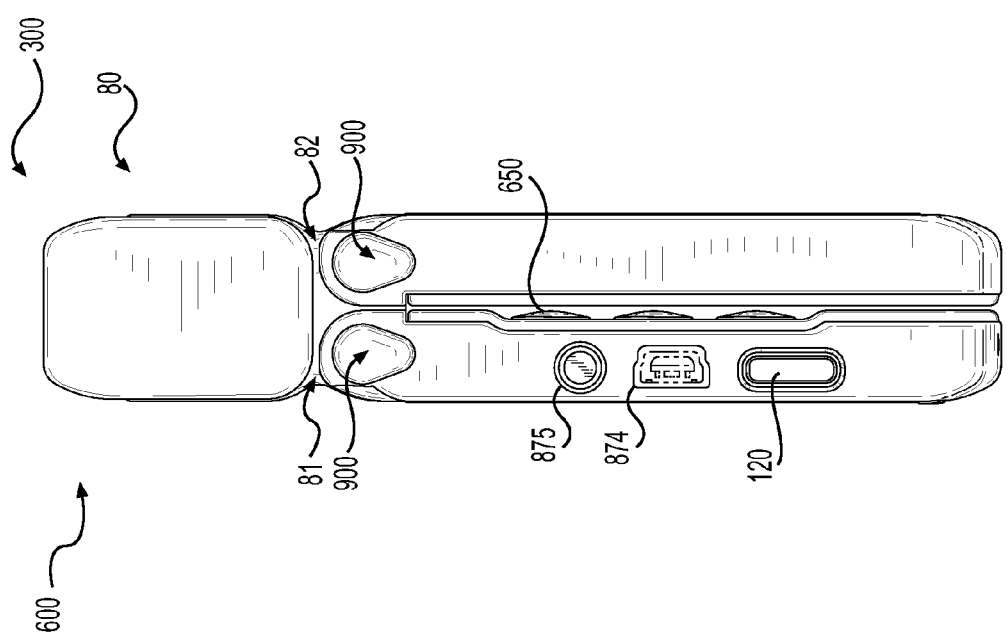
FIG. 10 illustrates a right side view of the clam-shell style handheld electronic device of FIG. 8.

A closed configuration 600 from the right side is also shown FIG. 10. Although it is compact, the device 300 has multiple input and output faculties, even when in the closed configuration 600. For example, a programmable key 120, a universal serial bus port 874 and a headset jack 875 are shown on the exterior of the device 300 on the display housing. Those skilled in the art will appreciate that the programmable keys of the device 105, 120 can be programmed to have multiple functions, allowing the keys to activate a camera, act as an alternate mute button, a function cancel button, among other things. In at least one example as illustrated in FIG. 10, some portion of the keyboard 650 can be seen between the keyboard housing 90 and display housing 95. In another possible embodiment the device 300 could be so configured so as to completely conceal the keyboard 650 when viewed from the same side as in FIG. 10 while still coming within this disclosure. Also, the dual-hinged interconnector 80 can be seen between and above the hinge-end covers 900 in the illustrated example. In the embodiment pictured in FIG. 10, the thickness of the interconnector $T_T$ is equal to the combined thickness of the display housing 95 and the keyboard housing 90. The connectors could be located on the sides of the interconnector 80 closest to the housings 95, 90 and parallel to the lengthwise axis, or on the sides which are closest to the housings 95, 90 but perpendicular to said axis.

Figure 11:
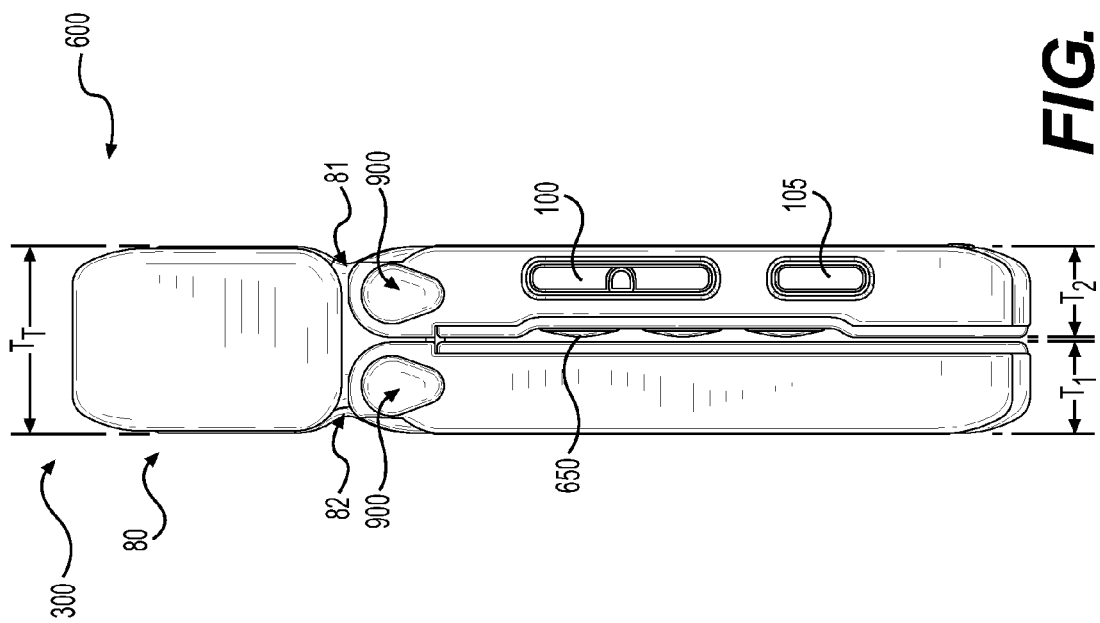
FIG. 11 illustrates a left side view of the clam-shell style handheld electronic device of FIG. 8.

The other side view of the device 300 in a closed configuration 600 is shown in FIG. 11. Even though the embodiment is streamlined and compact, multiple input and output options exist. For example, in the embodiment of FIG. 11, the volume buttons or keys 100 in the keyboard housing 90 are situated next to a user-programmable key 105. The volume buttons or keys can be configured so as to adjust the speaker (not shown) volume when the device 300 is used a telephone or to adjust the volume of the audio output associated with other functionalities. FIG. 11 shows the dual-hinged interconnector 80 between and above two hinge-end covers 900. As will be described further herein, still other input and output options can be provided on the exterior of the device 300. Again, as will be appreciated by those in the art, while a particular shape is shown, others are possible while still falling within the present disclosure, for example handheld electronic device 300 might be more or less oblong when closed 600, the sides could be fashioned to be somewhat arcuate, thus giving the device a near oval shape.

Figure 12:
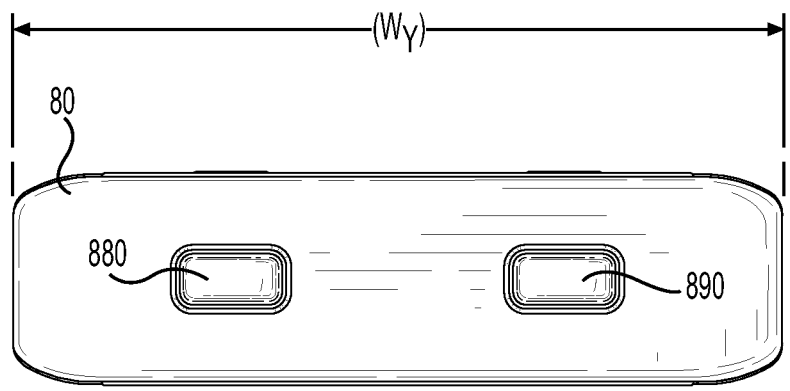
FIG. 12 illustrates a top plan view of the clam-shell style handheld electronic device of FIG. 8.

The top of an embodiment of the device 300 in a closed configuration 600 is depicted in FIG. 12. A mute/suspend key 880 is shown on the left side of the exterior of the dual-hinged interconnector 80 and a speaker phone button 890 is on the right. Such locations are examples only, and other possibilities exist within the present disclosure. Also, other keys or buttons can be located on the dual-hinged interconnector 80 which can take various shapes. Within the dual-hinged interconnector resides a spring assembly (not shown) which runs through interconnector 80 to the hinge-end covers 900.

Figure 13:
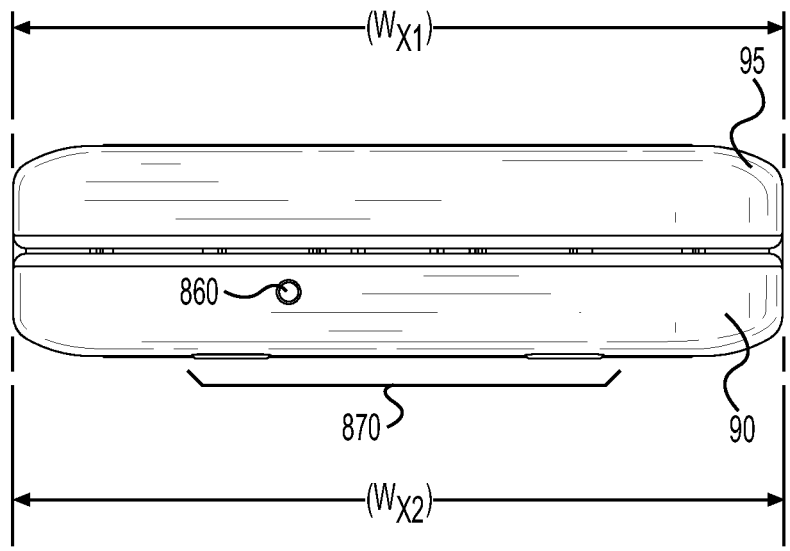
FIG. 13 illustrates a bottom plan view of the clam-shell style handheld electronic device of FIG. 8.

Both FIGS. 12 and 13 show an embodiment wherein the dual-hinged interconnector 80 is of a width $W_Y$ which is substantially equal to the width of the display housing $W_{X1}$ and the width of the keyboard housing $W_{X2}$. Other embodiments having different widths are possible within this disclosure. For example, the widths mentioned could range between six and nine centimeters. Making the handheld electronic device 300 wider than nine inches would probably be undesirable due to a loss in convenience of storage—it would not fit in the average pocket or hand.

The compact nature of the device 300, which is at least in part made possible by the dual-hinged interconnector 80, is shown in FIG. 13. The thinness of the device 300 can be seen in FIG. 13 insofar as the thickness of the dual-hinged interconnector $T_T$ in FIG. 12 is the same as the sum of the thickness of the keyboard housing T2 and the display housing T3, these thicknesses being measured in a direction substantially perpendicular the lengthwise axis of the display housing $L_{X1}$ and the lengthwise axis of the keyboard housing $L_{X2}$ when the device 300 is in a resting orientation 603 while closed 600. It is contemplated that the desired value for the total thickness $T_T$ of the device will fall in a range of about one to two centimeters (though other values are of course possible within this disclosure).

Figure 14:
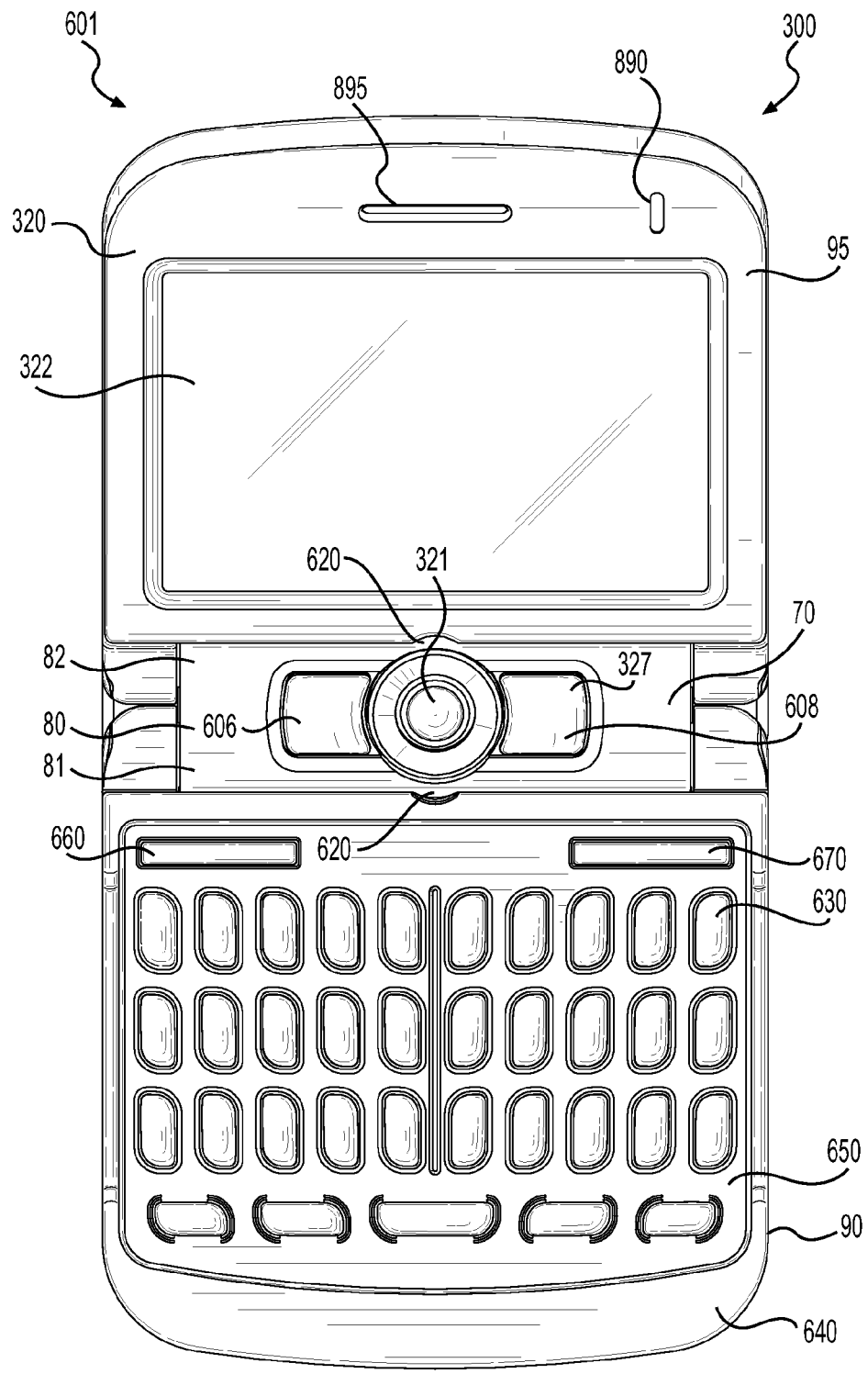
FIG. 14 illustrates a front view of a clam-shell style handheld electronic device in an open configuration.

FIG. 14 shows the device 300 in an open configuration 601. As set forth above, maintenance of a visual line of sight with the display screen 322 can be desirable when the user places the device 300 on a flat surface such as a desk or table. As discussed previously, a dual-hinged interconnector 80 containing a spring assembly (not shown) is disclosed which will bias the interior surface of the display housing 320 at a suitable angle A1 with the interior surface of the keyboard housing 640. As shown in FIG. 14, the interior face of the keyboard housing 640 includes a keyboard 650 with a plurality of keys that can be of a physical nature such as actuable buttons, or they can be of a software nature, typically constituted by virtual representations of physical keys on a display screen 322 (referred to herein as "virtual keys"). In this instance the physical keyboard illustrated could be replaced with a second display configured for touch engagement. It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the program/application 358 or feature in use, specific keys can be enabled or disabled.

In the case of physical keys of the type shown in FIG. 14, all or a portion of the plurality of keys can have one or more indicia representing character(s), command(s), and/or functions(s) displayed at their top surface and/or on the face of the area adjacent the respective key. In the instance where the indicia of a key's function is provided adjacent the key, the indicia can be printed on the device cover beside the key, or in the instance of keys located adjacent the display screen 322. Additionally, indicia for the key can be temporarily shown nearby the key on the display screen 322. As will be appreciated by those in the art, physical and virtual keys can be combined in many different ways. In one embodiment, physical and virtual keys could be combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

As made clear previously, the clam-shell style handheld electronic device 300 is configured to send and receive voice communications such as mobile telephone call and the functionality of the device can be afforded to the operator through designated keys. For example, two call keys 660, 670 can be provided below the navigation row 70 (so-called because it includes the navigation tool 327) as shown in FIG. 14 which can facilitate telephone usage. One of the two call keys is a call initiation key 660, and the other is a call termination key 670. The navigation row 70 also includes another pair of keys 606, 608 that are located immediately adjacent to the navigation tool 327, with one flanking key on either side of the navigation tool 327. The flanking keys 606, 608 can, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys can, of course, be provided by buttons that are located elsewhere on the handheld device 300, with different functions assigned to the flanking keys 606, 608.

As shown in FIG. 14, both the keyboard housing 90 and display housing 95 can have an accommodation space 620 recessed into each housing that receives at least a portion of the trackball assembly 321 when the device 300 is in a closed configuration 600. In this configuration, the dual-hinged interconnector provides a mounting platform for the trackball assembly 321 and the keyboard housing 90 and display housing accommodate for a protruding trackball assembly 321 with the accommodation space 620 in the respective housing. In other embodiments, the accommodation space 620 might be provided only on the keyboard housing 90 or only on the display housing 95.

FIG. 15 illustrates a right side view of a clam-shell style handheld electronic device 300 in an open configuration 601. Two hinge covers 900 as well as a head set jack 875, universal serial bus port 874 and user programmable key 120 are visible. Also visible in the example of FIG. 15 is the top of a trackball assembly 321. The interior surface of the keyboard housing 640 can be seen to be oriented at an obtuse angle A1 to interior surface of the display housing 320. The dual-hinged interconnector 80 can be configured such that the obtuse angle measures approximately 165 degrees. Alternately, the dual-hinged interconnector 80 could be set up for a 150 degree angle between the display 320 and the keyboard 650. The lengthwise longitudinal axis of the dual-hinged interconnector 80 is shown oriented at an obtuse angle A2, A3 to the lengthwise longitudinal axis of the display and keyboard housings 95, 90 in the open configuration of the device 600.

As described above, those skilled in the art will recognize that other angle configurations are possible within the scope of the present disclosure.

It will be understood that the foregoing description is that of certain embodiments and that various changes and modifications can be made thereto without departing from the scope of this disclosure.

We claim:

1. A clam-shell style handheld electronic device transitionable between open and closed configurations, said device comprising:

a display housing pivotally coupled by a dual-hinged interconnector to a keyboard housing, said display housing having a display screen located at an interior surface thereof facing a keyboard on an interior surface of said keyboard housing in the closed configuration of the device and wherein at least one of the display housing and the keyboard housing includes a camera to the exclusion of the dual-hinged interconnector, the dual-hinged interconnector being disposed between a pair of hinge ends for each of the display housing and the keyboard housing;

said dual-hinged interconnector having a thickness substantially equal to a combined thickness of said display and keyboard housings in the closed configuration of the device; and said dual-hinged interconnector having a length greater than at least twenty percent of a length of the longer of said display and keyboard housings and wherein lengthwise longitudinal axes of each of said display and keyboard housings and said dual-hinged interconnector are oriented substantially parallel, one to the others, in the closed configuration of the device.

2. The clam-shell style handheld electronic device as recited in claim 1, wherein an interior angle formed by the lengthwise longitudinal axes of said display and keyboard housings are oriented at an obtuse angle to one another in the open configuration and the lengthwise longitudinal axis of said dual-hinged interconnector is oriented at an obtuse angle to the lengthwise longitudinal axis of at least one of said display and keyboard housings in the open configuration of the device.

3. The clam-shell style handheld electronic device as recited in claim 2, wherein the lengthwise longitudinal axis of said dual-hinged interconnector is oriented at an obtuse angle to both of the lengthwise longitudinal axes of said display and keyboard housings in the open configuration of the device.

4. The clam-shell style handheld electronic device as recited in claim 3, wherein said dual-hinged interconnector has a width substantially equal to a width of each of said display and keyboard housings, said widths measured in a direction substantially perpendicular to said lengthwise axes in the closed configuration of the device.

5. The clam-shell style handheld electronic device as recited in claim 4, wherein said thicknesses are measured in a direction substantially perpendicular to said lengthwise axes in the closed configuration of the device.

6. The clam-shell style handheld electronic device as recited in claim 4, wherein said thicknesses are measured in a substantially vertical direction in a resting orientation of the device in the closed configuration.

7. The clam-shell style handheld electronic device as recited in claim 5, wherein said lengthwise longitudinal axes extend in a substantially horizontal direction in a resting orientation of the device in the closed configuration.

8. The clam-shell style handheld electronic device as recited in claim 3, wherein said widths are measured in a substantially horizontal direction in a resting orientation of the device in the closed configuration.

9. The clam-shell style handheld electronic device as recited in claim 1, wherein said dual-hinged interconnector has a navigation device located at an interior surface thereof in the closed configuration of the device.

10. The clam-shell style handheld electronic device as recited in claim 9, wherein said navigation device is a trackball assembly comprising a trackball, said trackball assembly being predominantly housed within said dual-hinged interconnector and a portion of said trackball being exposed at the interior surface of said dual-hinged interconnector in the open configuration of the device.

* * * * *